US 11,681,119 B2

(12) United States Patent
Oikawa (10) Patent No.: US 11,681,119 B2
(45) Date of Patent: Jun. 20, 2023

(54) OPTICAL DRIVING APPARATUS AND OPTICAL APPARATUS

(71) Applicant: CANON KABUSHIKI KAISHA, Tokyo (JP)

(72) Inventor: Makoto Oikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 17/178,133

(22) Filed: Feb. 17, 2021

(65) Prior Publication Data

US 2021/0255419 A1 Aug. 19, 2021

(30) Foreign Application Priority Data

Feb. 19, 2020 (JP) ............................. JP2020-026593

(51) Int. Cl.
*G02B 7/10* (2021.01)
*G02B 7/02* (2021.01)
*G02B 27/64* (2006.01)

(52) U.S. Cl.
CPC .............. *G02B 7/10* (2013.01); *G02B 7/023* (2013.01); *G02B 27/646* (2013.01)

(58) Field of Classification Search
CPC ........ G02B 7/10; G02B 7/023; G02B 27/646; G02B 7/08; G02B 7/04; G03B 3/10; G03B 2205/0061
See application file for complete search history.

(56) References Cited

U.S. PATENT DOCUMENTS

| | | | | |
|---|---|---|---|---|
| 5,515,210 A | * | 5/1996 | Devenyi | G02B 7/02 359/823 |
| 5,644,440 A | * | 7/1997 | Akada | G02B 7/08 359/811 |
| 5,745,470 A | * | 4/1998 | Nagai | G11B 7/08582 720/666 |
| 9,671,616 B2 | | 6/2017 | Espersen et al. | |
| 2016/0062133 A1 | * | 3/2016 | Espersen | G02B 27/646 359/557 |

* cited by examiner

*Primary Examiner* — Darryl J Collins
*Assistant Examiner* — Matthew Y Lee
(74) *Attorney, Agent, or Firm* — Cowan, Liebowitz & Latman, P.C.

(57) ABSTRACT

An optical driving apparatus includes a holder configured to hold an optical element and including a first contact portion and a second contact portion that are spaced from each other in an optical axis direction, a guide member configured to contact the first contact portion and the second contact portion and to guide the holder in the optical axis direction, and a biasing member configured to generate a biasing force serving as a magnetic force configured to bias the holder so that the first contact portion and the second contact portion are pressed against the guide member. The biasing member is disposed between the first contact portion and the second contact portion in the optical axis direction.

10 Claims, 5 Drawing Sheets

OPTICAL DRIVING APPARATUS AND OPTICAL APPARATUS

BACKGROUND OF THE INVENTION

Field of the Invention

The present invention relates to an optical driving apparatus configured to drive an optical element, such as a lens, in an optical axis direction in an optical apparatus, such as a digital camera and an interchangeable lens.

Description of the Related Art

In one conventional optical driving apparatus, a lens holder that holds a lens is guided in the optical axis direction by a guide member such as a guide bar. U.S. Pat. No. 9,671,616 discloses an optical driving apparatus that guides a lens holder in the optical axis direction through a first guide bar that penetrates through two holes in the lens holder spaced in the optical axis direction, and restricts the lens holder from rotating around the first guide bar by bringing a rolling member provided on the lens holder into contact with a second guide bar. In this optical driving apparatus, the rolling member is pressed against the second guide bar by the magnetic force (magnetic attraction force) acting between the magnet provided near the rolling member in the lens holder and the second guide bar.

The optical driving apparatus disclosed in U.S. Pat. No. 9,671,616 includes a single rolling member that contacts the second guide bar, and the lens holder is likely to tilt around the axial of the rolling member. Thus, it is difficult to control positioning of the lens holder in a direction orthogonal to the optical axis and tilt suppressing relative to the optical axis.

SUMMARY OF THE INVENTION

The present invention provides an optical driving apparatus configured to control positioning and tilt suppressing of a holder that holds an optical element and contacts a guide member by a magnetic force.

An optical driving apparatus according to one aspect of the present invention includes a holder configured to hold an optical element and including a first contact portion and a second contact portion that are spaced from each other in an optical axis direction, a guide member configured to contact the first contact portion and the second contact portion and to guide the holder in the optical axis direction, and a biasing member configured to generate a biasing force serving as a magnetic force configured to bias the holder so that the first contact portion and the second contact portion are pressed against the guide member. The biasing member is disposed between the first contact portion and the second contact portion in the optical axis direction. An optical apparatus having the above optical driving apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
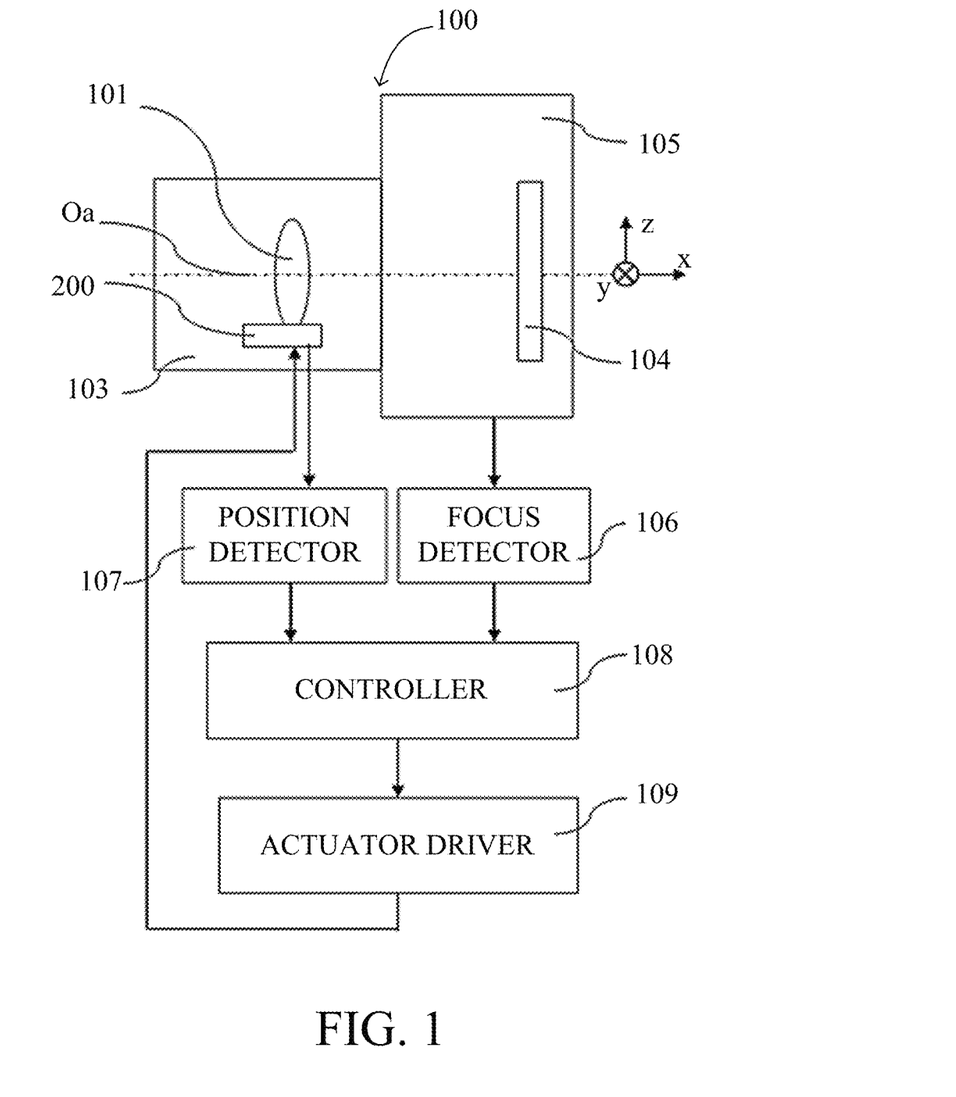
FIG. 1 is a block diagram showing a configuration of an image pickup apparatus including a lens driving apparatus according to a first embodiment of the present invention.

FIG. 1 illustrates a configuration of an image pickup apparatus (digital camera) 100, which serves as an optical apparatus including a lens driving apparatus serving as an optical driving apparatus according to a first embodiment of the present invention. In FIG. 1 and other figures, a direction in which an optical axis Oa of an imaging optical system described later extends (optical axis direction) is set to an x-direction, a normal direction of a sliding surface of a vibration type actuator described later is set to a z-direction, and a direction orthogonal to the x-direction and the z-directions is set to a y-direction. Axes extending in the y-direction and the z-direction will be referred to as a y-axis and a z-axis, respectively.

The image pickup apparatus 100 includes a barrel 103 and a camera body 105. The barrel 103 includes an imaging optical system including a focusing lens 101 serving as an optical element, a lens driving apparatus including a vibration type actuator 200 for driving the lens 101 in the x-direction, and a position detector 107 for detecting a position of the lens 101 in the x-direction.

The camera body 105 includes an image sensor (image pickup element) 104 configured to capture (photoelectrically convert) an optical image formed by the imaging optical system, and a focus detector 106 configured to detect a focus state of the optical image formed on the image sensor 104. The camera body 105 further includes a controller 108 configured to control the vibration type actuator 200 via a actuator driver 109 so that the position of the lens 101 detected by the position detector 107 moves to an in-focus position according to the focus detecting result by the focus detector 106.

Figure 2:
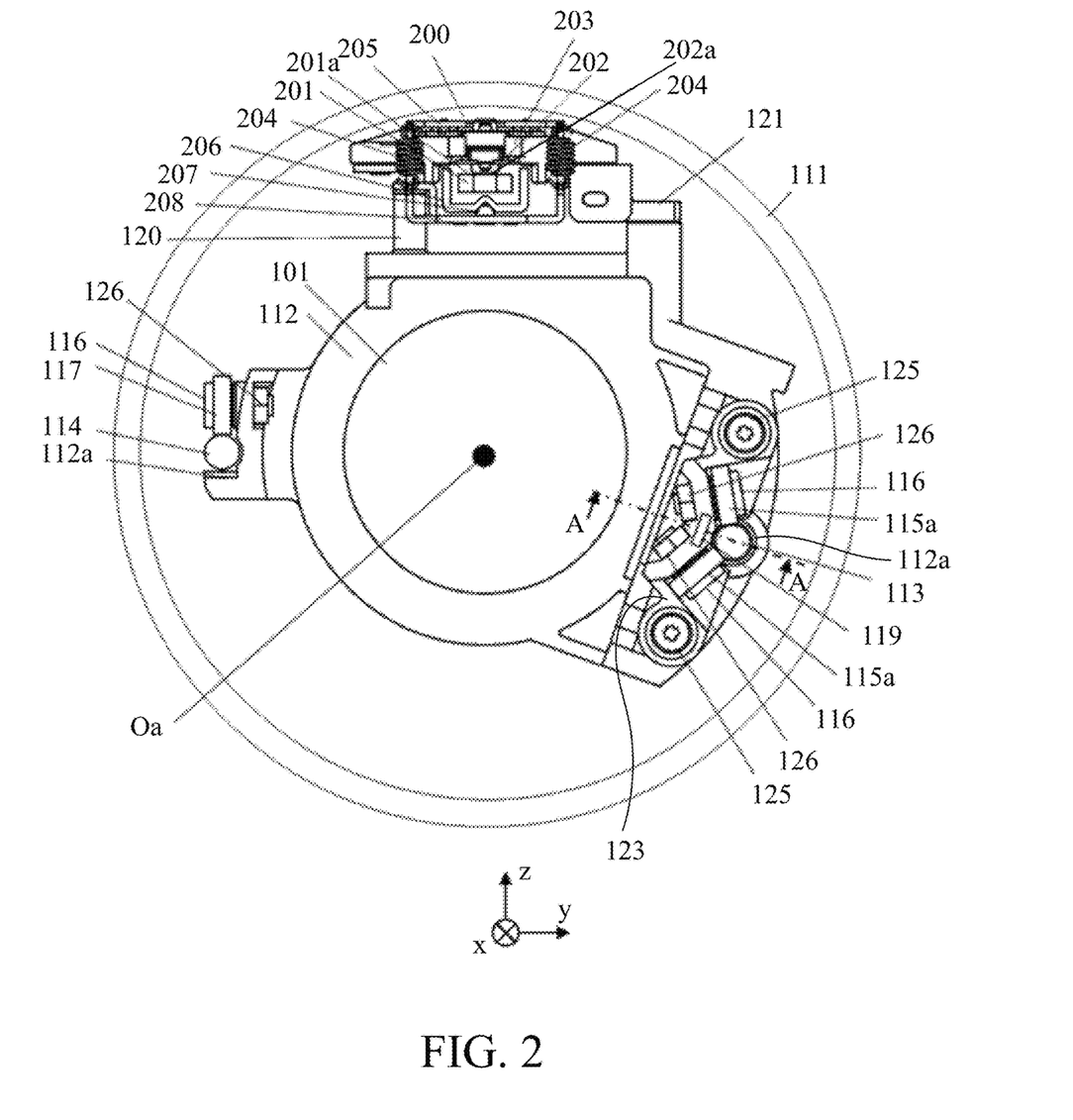
FIG. 2 is a front view of the lens driving apparatus according to the first embodiment.

FIG. 2 illustrates the lens driving apparatus viewed from the −x-direction that drives the lens 101 in the x-direction using the vibration type actuator 200. The vibration type actuator 200 includes a movable portion that generates vibrations and a fixed portion with which the movable portion is in pressure contact. The movable portion moves in the x-direction relative to the fixed portion. The detailed configurations of the movable portion and the fixed portion will be described later. The reaction force of a second biasing force, which will be described later, acts as a force that presses the movable portion against the fixed portion.

Figure 3:
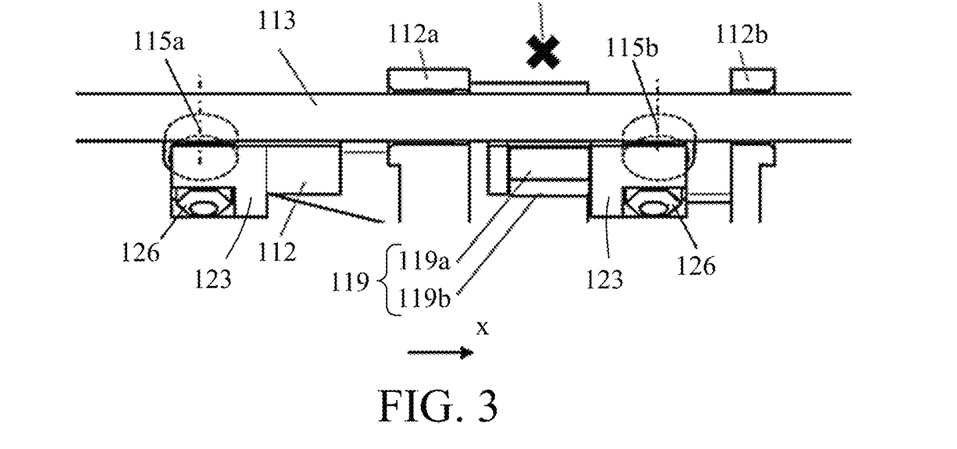
FIG. 3 is a sectional view in section taken along a line A-A in FIG. 2.
Figure 4:
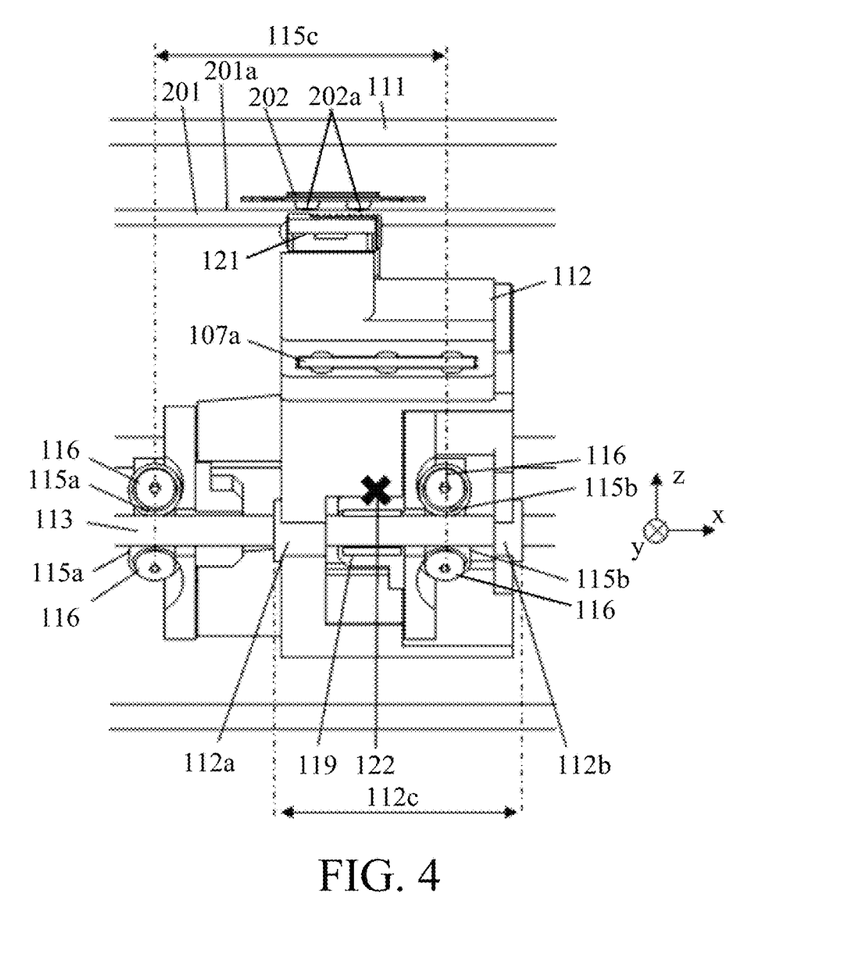
FIG. 4 is a side view showing a positional relationship between a roller and a vibration type motor according to the first embodiment.

FIG. 3 illustrates a section taken along a line A-A in FIG. 2. FIG. 4 illustrates a lens holder 112 viewed from the y-direction, which will be described later.

A fixed barrel 111 is a cylindrical member and is fixed in the barrel 103. The fixed barrel 111 holds a front end portion and a rear end portion of a first guide member 113 and a second guide member 114, which will be described later, in the x-direction.

The lens holder 112 is a member that holds the lens 101 and is movable in the x-direction relative to the fixed barrel 111. Rolling member bases 123 are fixed by screws 125 at locations of the lens holders 112 spaced in the x-direction. Two (a pair of) first rolling members 115a are rollably (or rotatably) fixed onto the front rolling member base 123 by a shaft screw 116 and a nut 126. The first rolling members 115a form a first contact portion. As illustrated in FIGS. 3 and 4, a pair of second rolling members 115b are rollably fixed onto the rear rolling member base 123 in the same manner as the front rolling member base 123. The second rolling members 115b form a second contact portion. In the following description, the first and second rolling members 115a and 115b are collectively referred to as a guide rolling member 115.

The pair of guide rolling members 115 are fixed onto the rolling member base 123 so that their axes, which are rolling centers, form an angle of 60°, and contact, in two directions different from each other (directions forming 120°), a first guide member (guide bar) 113 having a round rod shape extending in the x-direction. When the pair of guide rolling members 115 contact the first guide member 113 in two directions different from each other, parallel displacements of the lens holder 112 are restricted in the y-direction and the z-direction (hereinafter collectively referred to as a yz-direction) relative to the first guide member 113.

The two directions in which the pair of guide rolling members 115 contact the first guide member 113 may be two directions forming an angle other than 120°.

In this embodiment, the first guide member 113 is made of a magnetic material. As illustrated in FIG. 3, a first biasing member 119 is fixed as a magnetic biasing member between the front and rear rolling member bases 123 in the lens holder 112 (position adjacent to the rear rolling member base 123 in this embodiment). The first biasing member 119 includes a magnet 119a and a yoke 119b, and gives a first biasing force to the lens holder 112 by a magnetic force (magnetic attraction force) acting with the first guide member 113 which is a magnetic body. A magnetizing direction of the magnet 119a is a direction toward the first guide member 113, and a direction of the first biasing force is also a direction toward the first guide member 113. Due to this first biasing force, the pair of guide rolling members 115 are pressed against the first guide member 113.

The magnet 119a may have a single pole or multiple poles, and no yoke 119b is necessary in the case of the single pole. A plurality of first biasing members may be provided between the front and rear rolling member bases 123. The first biasing member may be formed of a magnetic material, and the first guide member may be formed of a magnet.

When the lens holder 112 moves in the x-direction while the pair of guide rolling members 115 are pressed against the first guide member 113, the guide rolling members 115 roll. Therefore, it is possible to move the lens holder 112 can be guided and moved in the x-direction with a low friction load.

In this embodiment, a ball bearing is used for the guide rolling member 115. However, any rolling member such as a roller or a rolling ball may be used. Instead of the guide rolling member 115, a sliding member formed of a material having good slidability may be provided as the first and second contact portions.

A third rolling member 117 is rollably fixed by a shaft screw 116 and a nut 126 onto the lens holder 112 on the side opposite to the guide rolling member 115 with respect to the optical axis Oa. The third rolling member 117 contacts, in the +z-direction, a second guide member (rotation stopping bar) 114 having a round rod shape and extending in the x-direction. When the third rolling member 117 contacts the second guide member 114, the lens holder 112 can be restricted from rotating around the first guide member 113 in the yz plane. The first and second guide members 113 and 114 may have a polygonal rod-shaped member or a plate-shaped member.

A second biasing member 120, which is an elastic member such as a spring, is disposed between the lens holder 112 and the movable portion of the vibration type actuator 200. The movable portion of the vibration type actuator 200 is connected to a connector 121 provided on the lens holder 112 so as to cause no idleness in the x-direction. One end of the second biasing member 120 contacts the movable portion of the vibration type actuator 200, and its other end contacts the lens holder 112 and is compressed so as to provide to the second biasing member 120 a second biasing force as an elastic force for pressing the third rolling member 117 against the second guide member 114. The second biasing force is smaller than the first biasing force.

When the vibration type actuator 200 is driven and the lens holder 112 is moved in the x-direction while the third rolling member 117 contacts the second guide member 114, the third rolling member 117 rolls. Therefore, the lens holder 112 can be moved and guided in the x-direction with a low friction load, and restricted from rotating around the first guide member 113.

The lens holder 112 (or the lens 101) can be steadily guided in the x-direction with a low load by a guide mechanism including the first and second guide members 113 and 114, the guide rolling member 115, the third rolling member 117, and the first and second biasing members 119 and 120, as described above.

Next follows a detailed description of the configuration of the vibration type actuator 200. A vibrator (vibrating body) 202 is formed by adhering a piezoelectric element as an electric-mechanical energy conversion element to an elastic body, and is held by a vibrator holder 203. The vibrator 202 has two protrusions 202a spaced from each other in the x-direction. A tip of the protrusion 202a is in pressure contact with a sliding surface 201a of a friction member (contact body) 201 in the −Z-direction by the pressing force of the spring 204 acting on the vibrator 202 via a transmission member 205. Both ends of the spring 204 are hung on the transmission member 205 and a movable guide plate 208. The movable portion includes the vibrator 202, the vibrator holder 203, the spring 204, the transmission member 205, and the movable guide plate 208.

The friction member 201 is fixed in the x-direction by a fixed guide plate 206. The fixed portion includes the friction member 201 and the fixed guide plate 206. A groove extending in the x-direction is formed in each of the fixed guide plate 206 and the movable guide plate 208, and a ball 207 is disposed between both grooves.

When a frequency signal is applied to the piezoelectric element of the vibrator 202, vibrations are excited to the vibrator 202 and the tip of the protrusion 202a performs an elliptic motion. The movable portion is driven in the x-direction relative to the fixed portion by the friction between the elliptically moving tip of the protrusion 202a and the sliding surface 201a of the friction member 201 that is in pressure contact with the tip. At this time, as the ball 207 rolls, the movable portion is guided in the x-direction with a low friction load. The friction member may move relative to the vibrator, and the vibrator and the friction member may move relative to each other.

The connector 121 in the lens holder 112 is connected to the vibrator holder 203 in the movable portion. Therefore, the lens holder 112 is driven in the x-direction as the movable portion moves in the x-direction.

In this embodiment, as described above with reference to FIG. 3, the pair of guide rolling members 115 provided on the lens holder 112 at each of the two locations in the x-direction via the rolling member bases 123 contact the first guide member 113 in two directions different from each other. Thereby, the position of the lens holder 112 in the yz-direction can be determined, and the lens holder 112 can be prevented from tilting around the y-axis and the z-axis (in the optical axis direction).

As the distance between the first biasing member 119 and the first guide member 113 increases, the magnetic attraction force between them sharply weakens. Therefore, the guide rolling members 115 may fall off from the first guide member 113 due to an external force applied in the direction in which the lens holder 112 separates from the first guide member 113 due to an impact caused by dropping the image pickup apparatus 100 or the like.

Accordingly, this embodiment provides, as illustrated in FIGS. 2 and 3, a first stopper portion 112a and a second stopper portion 112b that are engaged with (contact) the first guide member 113 at positions of the lens holder 112 different from each other in the x-direction and restrict the lens holder 112 from displacing (moving) in the direction separating from the first guide member 113. Each of the first and second stopper portions 112a and 112b has holes through which the first guide member 113 perforates. An inner diameter of the hole is slightly larger than an outer diameter of the first guide member 113 so that the friction between the first and second stopper portions 112a and 112b and the first guide member 113 does not become a resistance to the movement of the lens holder 112 in the x-direction.

In FIG. 3, when an external force acts downwardly on the lens holder 112, the first and second stopper portions 112a and 112b contact the first guide member 113 and restrict the downward displacement of the lens holder 112 down to a small amount. Thereby, the guide rolling member 115 can be prevented from falling off from the first guide member 113.

Referring now to FIG. 3, a description will be given of a positional relationship among a center of gravity 122 of the lens holder 112 including the lens 101, the first and second rolling members 115a and 115b, and the first and second stopper portions 112a and 112b in the x-direction.

In FIG. 3, the first and second rolling members 115a and 115b are disposed at two locations sandwiching the center of gravity 122 in the x-direction. Thereby, even if the orientation of the image pickup apparatus 100 changes and the direction of gravity applied to the center of gravity 122 changes or an external force such as an impact is applied to the image pickup apparatus 100 and a force (acceleration) is suddenly applied to the center of gravity 122, one of the first and second rolling members 115a and 115b is less likely to float from the first guide member 113. In other words, while both the first and second rolling members 115a and 115b are maintained in contact with the first guide member 113, the position of the lens holder 112 relative to the first guide member 113 can be stably maintained.

Similarly, by disposing the first and second stopper portions 112a and 112b at two locations sandwiching the center of gravity 122 in the x-direction, only one of the first and second stopper portions 112a and 112b can suppress the displacement restricting state of the lens holder 112 even when a force is suddenly applied to the center of gravity 122. In other words, both the first and second stopper portions 112a and 112b can stably limit the displacement of the lens holder 112 relative to the first guide member 113.

Referring now to FIG. 4, a description will be given of a positional relationship among the first and second rolling members 115a and 115b, the first and second stopper portions 112a and 112b, the first biasing member 119, and the vibration type actuator 200. FIG. 4 omits some of the components illustrated in FIG. 2.

Similar to FIG. 3, FIG. 4 also illustrates that the center of gravity 122 of the lens holder 112 is located between the first and second rolling members 115a and 115b and between the first and second stopper portions 112a and 112b. A scale 107a is fixed onto the lens holder 112, which has a periodic pattern that is optically or magnetically read by the position detector 107 illustrated in FIG. 1. The position detector 107 outputs a periodic signal used by the controller 108 to detect the position of the lens holder 112 in the x-direction according to the read periodic pattern.

Where a range between the first and second rolling members 115a and 115b in the x-direction is a first range 115c, the first biasing member 119 is disposed in the first range 115c. Thereby, the first biasing member 119 and the first guide member 113 are less likely to separate in the yz-direction, and the magnetic attraction force (first biasing force) acting between the first biasing member 119 and the first guide member 113 can become stable. As a result, the position of the lens holder 112 relative to the first guide member 113 in the yz-direction can be made stable, and the lens holder 112 can be restrained from tilting around the y-axis and the z-axis.

Where a range between the first and second stopper portions 112a and 112b in the x-direction is a second range 112c, the first biasing member 119 is disposed in an area in the x-direction in which the first range 115c and the second range 112c overlap each other. Thereby, the first biasing member 119 and the first guide member 113 are much less likely to separate from each other in the yz-direction, and the magnetic attraction force acting between the first biasing member 119 and the first guide member 113 can be made more stable. As a result, the position of the lens holder 112 relative to the first guide member 113 in the yz-direction can be more stable, and the lens holder 112 can be more reliably restrained from tilting around the y-axis and the z-axis. This will be described again later with reference to relevant figures.

The two protrusions 202a in the vibrator 202 separated in the x-direction contact the sliding surface 201a of the friction member 201 in a state of being pressed by the spring 204 illustrated in FIG. 2. The protrusion 202a of the vibrator 202 is disposed within the first range 115c in the x-direction. The reasons will be discussed as follows.

When an external force exceeding the magnetic attraction force between the first biasing member 119 and the first guide member 113 suddenly acts on the lens holder 112 due to an impact or the like, the center of gravity 122 of the lens holder 112 is located in the first range 115c in the x-direction and thus the lens holder 112 tilts around one of the first rolling members 115a and 115b as a center. Then, since the vibrator 202 is connected to the lens holder 112 via the connector 121 and the vibrator holder 203 illustrated in FIG. 2, the rotational force caused by the tilt is transmitted to the vibrator 202 as well. If the protrusion 202a of the vibrator 202 is disposed outside the first rolling member 115a in the −x-direction, the protrusion 202a is pressed excessively strongly against the sliding surface 201a and the vibrator 202 may get damaged when the lens holder 112 rotates around the second rolling member 115b. When the protrusion 202a of the vibrator 202 is disposed outside the second rolling member 115b in the +x-direction, the vibrator 202 may similarly get damaged when the lens holder 112 rotates around the first rolling member 115a.

Accordingly, this embodiment provides the protrusion 202a of the vibrator 202 within the first range 115c in the x-direction. Thereby, when an external force exceeding the magnetic attraction force between the first biasing member 119 and the first guide member 113 is suddenly applied to the lens holder 112, this embodiment can prevent the protrusion 202a from excessively strongly being pressed against the sliding surface 201a and prevent the vibrator 202 from getting damaged.

Figure 5:
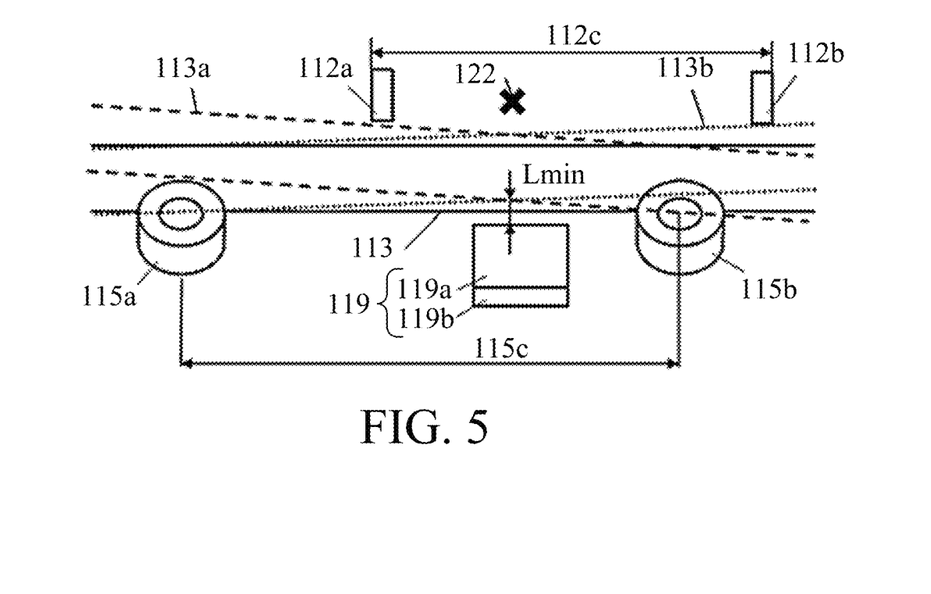
FIG. 5 is a diagram showing a positions of a magnetic biasing member according to the first embodiment.

Referring now to FIG. 5, a description will be given of the position and the effect of the first biasing member 119 in this embodiment. FIG. 5 illustrates a positional relationship among the first biasing member 119, the first guide member 113, the first and second rolling members 115a and 115b, and the first and second stopper portions 112a and 112b in the x-direction. Among the first and second rolling members 115a and 115b, which are spaced in the x-direction on the unillustrated lens holder 112 and contact the first guide member 113, the second rolling member 115b is disposed closer to the center of gravity 122 of the lens holder 112 than to the first rolling member 115a. The first biasing member 119 is disposed within the first range 115c between the first and second rolling members 115a and 115b.

As described above, when an external force such as an impact is applied to the image pickup apparatus 100 and a large force (acceleration) is applied to the center of gravity 122 of the lens holder 112, the first and second rolling members 115a and 115b provided on the lens holder 112a tilt to the first guide member 113. In FIG. 5, the first rolling members 115a and 115b are fixed, and the first guide member 113 tilts as illustrated by a broken line 113a and a dotted line 113b. In the following description, a tilted state in which the first guide member 113 is illustrated by the broken line 113a will be referred to as a first tilted state, and a tilted state in which the first guide member 113 is illustrated by the dotted line 113b will be referred to as a second tilted state.

When the first stopper portion 112a and the second rolling member 115b contact the first guide member 113 (113a) in the first tilted state, the first and second rolling members 115a and 115b (or the lens holder 112) are prevented from further tilting. A gap between the inner circumferential surface of the first stopper portion 112a and the outer circumferential surface of the first guide member 113 is set such that the first rolling member 115a is not separated from the first guide member 113 and the first guide member 113 contacts the first stopper portion 112a. When the second stopper portion 112b and the first rolling member 115a contact the first guide member 113 (113b) in the second tilted state, the first and second rolling members 115a and 115b are prevented from further tilting. A gap between the inner circumferential surface of the second stopper portion 112b and the outer circumferential surface of the first guide member 113 is set such that the second rolling member 115b is not separated from the first guide member 113 and the first guide member 113 contacts the second stopper portion 112b.

In any one of the first tilted state and the second tilted state, a distance between the first biasing member 119 and the first guide member 113 increases and the magnetic attraction force between them decreases. In order to minimize the distance increase in each tilted state, the first biasing member 119 may be disposed at a position opposite to an intersecting position between the first guide member 113 (113a) in the first tilted state and the first guide member 113 (113b) in the second tilted state overlap each other. Thereby, the distance in each tilted state can be reduced down to a small value Lmin. In order to realize this configuration, this embodiment disposes, as described above, the first biasing member 119 in an area where the first range 115c and the second range 112c overlap each other in the x-direction. Thereby, the magnetic attraction force acting between the first biasing member 119 and the first guide member 113 can be made stable, the lens holder 112 can be positioned in the yz-direction and prevented from tilting in the optical axis direction.

In FIG. 5, the gap between the first stopper portion 112a and the first guide member 113 and the gap between the second stopper portion 112b and the first guide member 113 are equal to each other. The first rolling member 115a is about to separate (fall off) from the first guide member 113 (113a) that is in contact with the first stopper portion 112a in the first tilted state, whereas the second rolling member 115b has a margin before separating from the first guide member 113 (113b) that is in contact with the second stopper portion 112b in the second tilted state. This is because the second stopper portion 112b is located outside the second rolling member 115b (outside the first range 115c) and the second stopper portion 112b has a tilt radius and a moving amount larger than those of the second rolling member 115b in the second tilted state.

A falling-off margin of the first rolling member 115a relative to the first guide member 113 can be increased in the first tilted state if the first stopper portion 112a is also disposed outside the first range 1115c. However, if both the first stopper portion 112a and the second stopper portion 112b are provided outside the first range 115c, the lens holder 112 may become larger in the x-direction.

Accordingly, this embodiment disposes only the second stopper portion 112b outside the first range 115c. Since it is necessary to provide a configuration for holding the lens 101 near the center of gravity 122 of the lens holder 112, the lens holder 112 does not become larger in the x-direction even if the second stopper portion 112b is provided. On the other hand, if the first stopper portion 112a is provided outside the first range 115c, the first stopper portion 112a is added to a position where no lens holder 112 originally exists and thus the entire lens holder 112 becomes larger in the x-direction. Therefore, this embodiment provides only the second stopper portion 112b outside the second rolling member 115b near the center of gravity 122 of the lens holder 112, secures the above falling-off margin, and makes the lens holding member 112 compact.

As described above, in this embodiment, the first rolling member (first contact portion) 115a and the second rolling member (second contact portion) 115b provided at different positions on the lens holders 112 in the x-direction contact the first guide member 113, and the first biasing member 119 is located within the first range 115c. Thereby, the lens holder 112 is less likely to tilt to the first guide member 113, and the lens holder 112 can be positioned in the yz plane and prevented from tilting around the y-axis and the z-axis.

Second Embodiment

Figure 6:
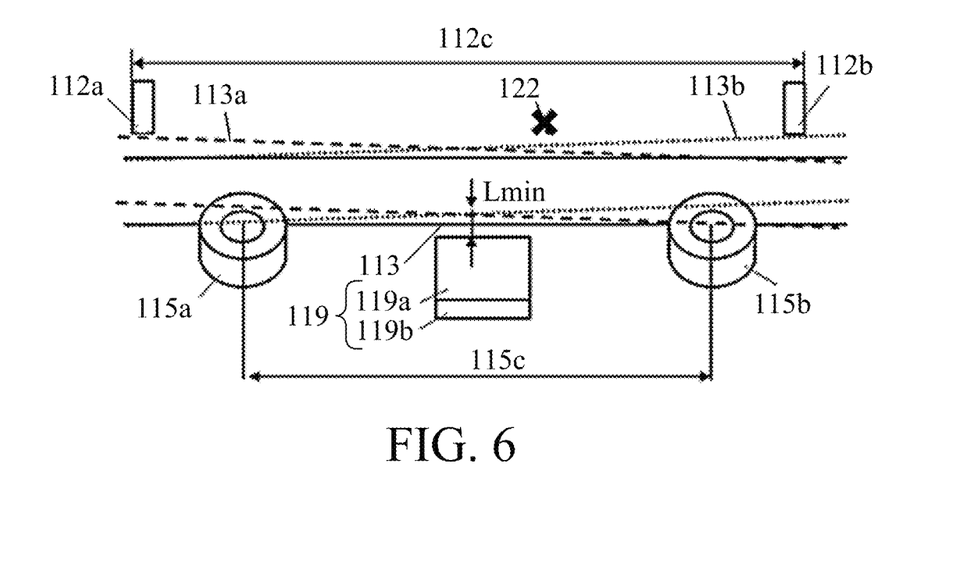
FIG. 6 is a diagram showing a positions of a magnetic biasing member according to a second embodiment of the present invention.

Referring now to FIG. 6, a description will be given of a lens driving apparatus according to a second embodiment of the present invention. In this embodiment, the components common to those in the first embodiment will be designated by the same reference numerals as those in the first embodiment, and differences from the first embodiment will be described.

In this embodiment, similar to the first embodiment, the second stopper portion 112b is disposed outside the second rolling member 115b (outside the first range 115c), and the first stopper portion 112a is also disposed outside the first rolling member 115a. In this configuration, the first stopper portion 112a has a tilt radius and a moving amount larger than those of the first rolling member 115a in the first tilted state. Therefore, even if the first stopper portion 112a contacts the first guide member 113, there is a margin until the first rolling member 115a separates from the first guide member 113.

As described above, this embodiment can secure the falling-off margin of the first rolling member 115a relative to the first guide member 113 as well as the falling-off amount of the second rolling member 115b relative to the first guide member 113.

Third Embodiment

Figure 7:
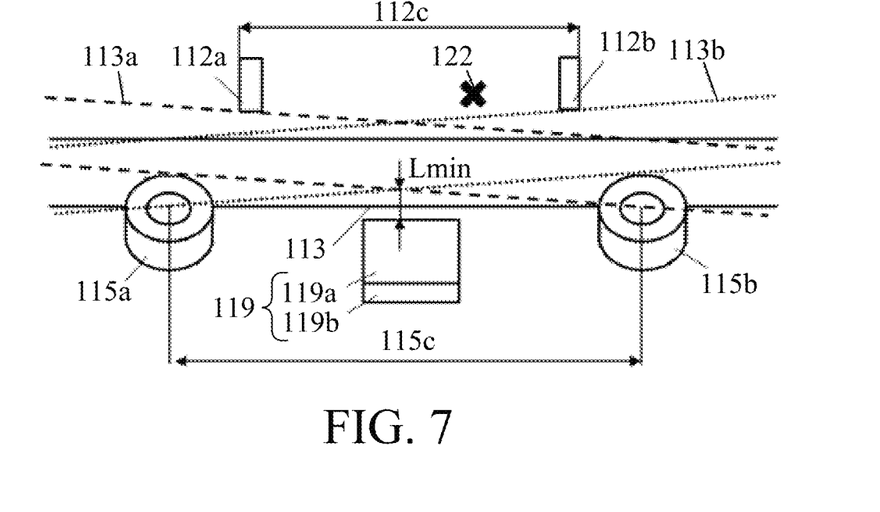
FIG. 7 is a diagram showing a position of a magnetic biasing member according to a third embodiment of the present invention.

Referring now to FIG. 7, a description will be given of a lens driving apparatus according to a third embodiment of the present invention. In this embodiment, the components common to those in the first embodiment will be designated by the same reference numerals as those in the first embodiment, and differences from the first embodiment will be described.

Similar to the first embodiment, in this embodiment, the first stopper portion 112a is disposed inside the first rolling member 115a (inside the first range 115c), and the second stopper portion 112b is also disposed inside the second rolling member 115b. In this configuration, the lens holder 112 can become more compact by an internally moving amount of the second stopper portion 112b than that in the first embodiment.

Since the second stopper portion 112b is located inside the second rolling member 115b, the second stopper portion 112b has a tilt radius and a moving amount smaller than those of the second rolling member 115b in the second tilted state. Therefore, the falling-off margin of the second rolling member 115b relative to the first guide member 113 is smaller than that of the first embodiment. However, the second rolling member 115b is about to separate from the first guide member 113 in a state where the first guide member 113 (113b) contacts the second stopper portion 112b, and never falls off.

As described above, this embodiment disposes both the first and second stopper portions 112a and 112b in the first range 115c, prevents the first and second rolling members 115a and 115b from falling off from the first guide member 113, and makes the lens holder 112 compact.

While each of the above embodiments has discussed the holder holding the lens, the holder may hold an optical element other than the lens, such as a filter, a diaphragm, and an image sensor.

Each of the above embodiment can provide an optical driving apparatus that brings the first and second contact portions of the holder into contact with the guide member by a magnetic force, positions the holder in a direction orthogonal to the optical axis direction, and prevents the holder from tilting in the optical axis direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-026593, filed on Feb. 19, 2020 which is hereby incorporated by reference herein in its entirety.

What is claimed is:

1. An optical driving apparatus comprising:
a holder configured to hold an optical element, being movable in an optical axis direction and including a first contact portion and a second contact portion that are spaced from each other in the optical axis direction;
a first guide member configured to contact the first contact portion and the second contact portion and to guide the holder in the optical axis direction;
a second guide member configured to contact a third contact portion and to stop a rotation of the holder; and
a biasing member configured to generate a biasing force serving as a magnetic force configured to bias the holder so that the first contact portion and the second contact portion are pressed against the first guide member,
wherein the biasing member is disposed between the first contact portion and the second contact portion in the optical axis direction,
wherein the holder includes a first stopper portion and a second stopper portion that are provided at locations different from those of the first contact portion and the second contact portion in the optical axis direction, are spaced from each other in the optical axis direction, contact the first guide member, and restrict the first contact portion and the second contact portion from displacing from the first guide member in directions different from the optical axis direction, and
wherein the biasing member is disposed in an area in the optical axis direction where a first range between the first contact portion and the second contact portion and a second range between the first stopper portion and the second stopper portion overlap each other.

2. The optical driving apparatus according to claim 1, wherein each of the first contact portion and the second contact portion includes a pair of contact portions configured to contact the first guide member in two directions different from each other.

3. The optical driving apparatus according to claim 1, wherein at least one of the first stopper portion and second stopper portion is disposed in the first range.

4. The optical driving apparatus according to claim 1, wherein at least one of the first contact portion and the second contact portion is disposed in the second range.

5. The optical driving apparatus according to claim 1, wherein at least one of the first stopper portion and the second stopper portion is located outside the first range in the optical axis direction, and outside one of the first contact portion and the second contact portion closer to a center of gravity of the holder.

6. The optical driving apparatus according to claim 1, wherein the first stopper portion and the second stopper portion are provided inside the first range in the optical axis direction.

7. The optical driving apparatus according to claim 1, further comprising a vibration type actuator that includes a vibrating body that provides vibrations and a contact body that contacts the vibrating body, the vibration type actuator being configured to drive the holder in the optical axis direction by moving the vibrating body and the contact body relative to each other, wherein the vibrating body contacts the contact body within the first range between the first contact portion and the second contact portion in the optical axis direction.

8. The optical driving apparatus according to claim 1, wherein the first range is larger than the second range.

9. The optical driving apparatus according to claim 1, wherein the second range is placed inside the first range.

10. An optical apparatus comprising an optical driving apparatus, wherein the optical driving apparatus includes:

a holder configured to hold an optical element, being movable in an optical axis direction and including a first contact portion and a second contact portion that are spaced from each other in the optical axis direction;

a first guide member configured to contact the first contact portion and the second contact portion and to guide the holder in the optical axis direction;

a second guide member configured to contact a third contact portion and to stop a rotation of the holder; and a biasing member configured to generate a biasing force serving as a magnetic force configured to bias the holder so that the first contact portion and the second contact portion are pressed against the first guide member, wherein the biasing member is disposed between the first contact portion and the second contact portion in the optical axis direction, wherein the holder includes a first stopper portion and a second stopper portion that are provided at locations different from those of the first contact portion and the second contact portion in the optical axis direction, are spaced from each other in the optical axis direction, contact the first guide member, and restrict the first contact portion and the second contact portion from displacing from the first guide member in directions different from the optical axis direction, and wherein the biasing member is disposed in an area in the optical axis direction where a first range between the first contact portion and the second contact portion and a second range between the first stopper portion and the second stopper portion overlap each other.

* * * * *